(12) United States Patent
van Druten et al.

(10) Patent No.: US 10,327,578 B2
(45) Date of Patent: Jun. 25, 2019

(54) DISPOSABLE ASSEMBLY, A SYSTEM AND METHOD FOR PREPARING A FOAMED FOOD PRODUCT

(71) Applicant: Friesland Brands B.V., Amersfoort (NL)

(72) Inventors: Wiebe Nicolaas van Druten, Amersfoort (NL); Maarten Joannes Botman, Amersfoort (NL)

(73) Assignee: FRIESLAND BRANDS B.V., Amersfoort (NL)

( * ) Notice: Subject to any disclaimer, the term of this patent is extended or adjusted under 35 U.S.C. 154(b) by 841 days.

(21) Appl. No.: 14/439,291

(22) PCT Filed: Oct. 29, 2013

(86) PCT No.: PCT/NL2013/050759
§ 371 (c)(1),
(2) Date: Apr. 29, 2015

(87) PCT Pub. No.: WO2014/069993
PCT Pub. Date: May 8, 2014

(65) Prior Publication Data
US 2015/0289710 A1   Oct. 15, 2015

(30) Foreign Application Priority Data
Oct. 29, 2012   (NL) ...................................... 2009712

(51) Int. Cl.
| A47J 31/44 | (2006.01) |
| A23C 9/152 | (2006.01) |
| B01F 3/04 | (2006.01) |

(52) U.S. Cl.
CPC ......... *A47J 31/4485* (2013.01); *A23C 9/1524* (2013.01); *B01F 3/04248* (2013.01); *B01F 3/04446* (2013.01); *B01F 2215/0006* (2013.01)

(58) Field of Classification Search
CPC ................ A23C 9/1524; A47J 31/4485; B01F 3/04248; B01F 3/04446
(Continued)

(56) References Cited

U.S. PATENT DOCUMENTS
2005/0118319 A1   6/2005   Green et al.

FOREIGN PATENT DOCUMENTS
| EP | 2043769 B1 | 9/2010 |
| WO | WO2100224 A2 | 12/2002 |
(Continued)

*Primary Examiner* — Jyoti Chawla
(74) *Attorney, Agent, or Firm* — Hoffmann and Baron, LLP (57) ABSTRACT

A disposable assembly contains a concentrated liquid food product and comprises an eductor and a microfiltration device. A water inlet of the eductor is configured for connection to an external source of water. A gas inlet of the microfiltration device is configured for connection to an external source of gas and an outlet of the microfiltration device is configured for discharging a foamed food product created by the microfiltration device from the disposable assembly. A system for preparing a foamed food product comprises a product preparation apparatus for preparing said foamed food product, and such a disposable assembly. The apparatus comprises a water source, a water heater and water pressurizing means configured for detachable connection to the eductor of the disposable assembly. The apparatus further comprises a pressurized gas source and gas pressurizing means configured for supplying pressurized gas to the microfiltration device. In a method for preparing a foamed food product heated water is supplied to the water inlet of said eductor for entraining concentrated liquid food product out of the holder and for mixing said concentrated liquid food product with the heated water.

38 Claims, 5 Drawing Sheets

(58) Field of Classification Search
USPC .......................................................... 426/564
See application file for complete search history.

(56) References Cited

FOREIGN PATENT DOCUMENTS

| WO | WO 2009110794 A1 * | 9/2009 | .......... A47J 31/4485 |
| WO | WO2009110794 A1 | 9/2009 | |
| WO | WO2011028117 A1 | 3/2011 | |

* cited by examiner

DISPOSABLE ASSEMBLY, A SYSTEM AND METHOD FOR PREPARING A FOAMED FOOD PRODUCT

This application is the U.S. National Phase of, and Applicants claim priory from, International Patent Application Number PCT/NL2013/050759 filed Oct. 29, 2013, which claims priority from NL 2009712 filed Oct. 29, 2012, each of which is incorporated herein by reference.

FIELD OF THE INVENTION

The invention relates to a disposable assembly for a liquid food product, for instance, a milk product, milk, foam, cream or aerated dessert, or a different product.

Such a disposable assembly is known from WO-A1-2011/028117. According to WO-A1-2011/028117 this disposable assembly, e.g. containing a product, such as milk, is operatively connected to an operating apparatus for e.g. producing and discharging milk foam or froth. The disposable assembly comprises a holder provided with a fluid entrance for supplying fluid, coming from a fluid supply means of the operating apparatus, to an inner space surrounded by the holder. The fluid supplied by the operating apparatus to the holder can hold the inner space at a desired pressure (in particular a superatmospheric, product expelling pressure), under the influence of which pressure the milk can be dispensed, via discharge means. This discharge means comprises a microfiltration device for foaming the milk by introducing a gas, such as air, via the microfiltration device to the milk flowing through the microfiltration device. The operating apparatus comprises cooling means to cool the milk in the disposable assembly for preventing potential degradation of the milk. Furthermore, for dispensing a hot product the operating apparatus can comprise a steam generator or hot water supply connected to a valve device positioned between the holder and the microfiltration device to heat milk expelled from the holder. In addition the valve device can be set such as to only pass the steam for cleaning the microfiltration device and optional devices downstream of the microfiltration device.

Although highly user-friendly, such a disposable assembly, especially when containing a perishable liquid food product such as milk, requires cooling during transport and also requires a cooling device in the operating apparatus, which requires a relatively large amount of energy. In addition, in case a hot foamed product is to be dispensed, the operating apparatus requires a steam generator for heating the milk, which not only consumes a relatively large amount of energy but also requires a mechanical construction which can resist the high pressures coming along with the production of steam, as a result of which the operating apparatus has to be mechanical robust and will thus be relatively costly. Besides, the hot foam product produced from milk contained within the disposable assembly has a so called "cooked milk taste" which most consumers find less appealing than the common taste of milk. Furthermore, since milk is highly perishable, additional measures are required regarding hygiene and as described in WO-A1-2011/028117 frequent cleaning is therefore required. This frequent cleaning is costly not only in view of e.g. the energy used to produce the steam for cleaning, but also in view of the down-time of the operating apparatus during such cleaning. In addition, the operating apparatus is required to have a fluid supply means for creating an overpressure within the holder to expel the liquid food product, such as milk, therefrom.

SUMMARY OF THE INVENTION

It is therefore an object of the present invention to provide a disposable assembly for a liquid food product, with which in particular a foamed product without a cooking taste can be obtained in a particularly efficient manner, with relatively inexpensive and durable means using only a relatively low amount of energy, with which in particular a high standard regarding hygiene can be realized with an at least substantial reduction of cleaning.

To this end, the invention provides a disposable assembly for a liquid food product, said disposable assembly comprising a holder containing said liquid food product in concentrated form; an eductor; a microfiltration device; a transfer tube connecting an outlet of said eductor with an inlet of said microfiltration device; a concentrated liquid food product tube connecting said holder to a concentrated liquid food inlet of said eductor; a water inlet tube connecting a water inlet of said eductor with a water connection of the disposable assembly, said water connection being configured for connection to an external source of water under pressure, said liquid food inlet of said eductor being positioned between said water inlet and said outlet of said eductor; a gas inlet tube connecting said microfiltration device to a gas connection of said disposable assembly, said gas connection being configured for connection to an external source of gas under pressure; and a foamed food product outlet tube connecting an outlet of the microfiltration device to an outlet connection of the disposable assembly for discharging a foamed food product, preferably a foamed liquid food product, created by the microfiltration device from the disposable assembly. By using a disposable assembly for a concentrated liquid food product, it is possible to store the disposable assembly for an extended period of time at ambient temperatures, i.e. without cooling, without degradation of the concentrated liquid food product. In particular the use of an eductor makes it possible to on the one hand add such an amount of water to the concentrated liquid food product that after mixing with the water a foamed food product with a substantially normal amount of dry matter, or normal amount of liquid content, also called an unconcentrated liquid content herein, is obtained. This provides the possibility to prepare a foamed food product having a particularly pleasant taste sensation. On the other hand the eductor can be used to entrain concentrated liquid food product out of the holder by the suction provided by the water flowing through the eductor, so that no additional devices are necessary to expel the concentrated liquid food product from the assembly. In this way, it is possible that a product preparation apparatus or operating apparatus in which the disposable assembly is to be used can be manufactured relatively compactly and relatively inexpensive. In addition, such a disposable assembly can contain the concentrated liquid food product very hygienically, e.g. in case the assembly is filled aseptically with the concentrated liquid food product.

In a particularly advantageous embodiment of a disposable assembly according to the invention said eductor comprises a housing containing a converging nozzle being in direct communication with said water inlet of said eductor, a mixing chamber and a low pressure zone (e.g. formed by a diffuser or venture) being in direct communication with said outlet of said eductor. In this manner a very efficient and reproducible mixing of the concentrated liquid food product with water can be realized, leading to a reproducible and stable foamed food product being prepared.

In a further embodiment of a disposable assembly according to the invention the microfiltration device is made of a hydrophobic material. In this manner the microfiltration device repels water and possible contaminations contained therein, which allows that the disposable assembly can be used in a more hygienic way. In a still further embodiment of a disposable assembly according to the invention the microfiltration device comprises a means with a microfiltration surface having gas transmissive pores, said microfiltration surface having a product inlet and a product outlet. In this manner, when the disposable assembly is operatively connected to a product preparation apparatus, liquid product flows through the means from the inlet to the outlet side in order to be provided with gas in a sterile manner.

In a preferred embodiment the microfiltration device comprises a microfiltration device with a tubular microfiltration wall having gas transmissive pores, said microfiltration device comprising an inlet opening and an outlet opening, said microfiltration device further comprising a housing surrounding said tubular microfiltration wall for forming a gas supply space between the tubular microfiltration wall and the housing, wherein said housing comprises a gas opening in communication with said gas inlet tube, said tubular microfiltration wall being made of a hydrophobic material. In this manner, when the disposable assembly is operatively connected to a product preparation apparatus, liquid product is supplied to the microfiltration device, in order to be provided with gas in a sterile manner, since the microfiltration device of hydrophobic material functions as a HEPA (High-Efficiency Particulate Air) filter, leading to a very hygienic manner of preparing the foamed food product. In particular when preparing a milk foam product the use of the inventive microfiltration device for adding gas to the product can provide a highly stable, attractive foam, in particular of constant quality, in a relatively simple manner. With various foamable products, moreover, a particularly high "overrun" (also sometimes called "degree of aeration") can be obtained. In this regard it is observed that the volume increase of a product after foaming is often denoted with the term "overrun" or "overrun percentage". The overrun percentage gives the volume increase of the product P after foaming with respect to the volume of the non-foamed product and can be represented as:

$$\text{Overrun} = \frac{W_P - W_s}{W_s} \times 100\%$$

wherein $W_p$ represents the mass of a fixed volume of unfoamed product and $W_s$ the mass of the same volume of foamed product (inclusive of any product drained therefrom). Thus, an overrun percentage of 100% means that a volume of 100 ml after dispensing has increased to 200 ml.

Preferably, the microfiltration wall comprises gas transmissive pores having a pore size in the range of 0.05-10 microns, in particular a pore size of at least 0.1 micron and less than 2 microns, more particularly a pore size of at least 0.2 micron and less than 1.5 microns.

The liquid food product contained within the disposable assembly can be (fruit) juice/drink, an alcohol-containing drink or drink base, for instance, beer or wine, a dairy or dairy-based drink, for instance, a whey drink or permeate-based drink, (milk) shake, chocolate drink, (drinking) yoghurt, sauce, ice cream or dessert, juice, the invention is in particular advantageous when the concentrated liquid food product is a milk based concentrated. The product can further comprise, for instance, vegetal or animal fat or oil, a thickener, sugar, sweeteners, flavoring, coloring and/or the like, and/or various other ingredients. The product could even comprise, for instance, a non-consumable product, a body care product, a hair treating agent, or the like. Preferably, the concentrated milk comprises 20 wt % dry matter to 30 wt % dry matter, preferably 23-27 wt % dry matter, whereas unconcentrated milk, i.e. milk with a normal liquid content, comprises 10 wt % dry matter.

In a further embodiment of a disposable assembly according to the invention, the holder for containing said liquid food product in concentrated form comprises a concentrated liquid food product connection being configured for connection to said concentrated liquid food product tube, wherein said eductor, said microfiltration device, said transfer tube, said concentrated liquid food product tube, said water inlet tube, said water connection, said gas inlet tube, said gas connection, said foamed food product outlet tube and said outlet connection are assembled as one unit which is detachably connected by said concentrated liquid food product tube to said concentrated liquid food product connection, said unit being preferably made of a hydrophobic material. In this manner a disposable assembly can be realized in a reproducible, relatively low cost manner, while preventing contamination of the contents of the assembly. The unit may, for instance, be undetachably connected to the holder and may be discarded, recycled or be otherwise disposed of after use, with or without the holder. Alternatively, the unit can be a separate part and can, for instance, be separated from a used holder to be fitted to a next holder. In the latter case, the unit is preferably sterilized, for instance by using a microwave oven, before reuse.

In a further embodiment of a disposable assembly according to the invention, hygiene can be improved further by closing off at least one connection, and preferably all, connections by an aseptic seal.

A disposable assembly according to an embodiment of the invention, e.g. in case of concentrated milk as concentrated liquid food product, can be used in professional business, such as restaurants, at ambient temperature, i.e. at room temperature up to 40° C. for one week without deterioration of the quality of milk. Furthermore, such a disposable assembly needs no replacement in a system which prepares milk foam at average numbers of servings, usually between 100 and 150 servings, when it contains an amount of 2 to 5 liters, preferably 3-4 liters of said milk in concentrated form. For home use, a disposable assembly according to the invention preferably contains an amount of 0.5 to 1 liter of said milk in concentrated form. The same holds true for other concentrated liquid food products.

In a preferred embodiment of a disposable assembly according to the invention, the disposable assembly comprises means for providing a constant gas flow to the microfiltration device, said means preferably being formed by a reducing valve. In use these means can ensure a correct working of the microfiltration device independent on how the gas under pressure is supplied at the gas connection of the disposable assembly.

In a still further embodiment of a disposable assembly according to the invention the water inlet tube of the disposable assembly comprises an injector valve for enabling connection of the water inlet of said eductor with the concentrated liquid food inlet of said eductor and disabling connection of the water inlet of said eductor with the concentrated liquid food inlet of said eductor, respectively. In this manner it is possible to close off the eductor from the concentrated liquid food inlet of said eductor so that contamination of the disposable assembly via the water connection can at least be reduced in that contact between water and the concentrated liquid food product can be avoided when the connection of the water inlet of the eductor with the concentrated liquid food inlet of said eductor is disabled. Preferably, the injector valve is a rotatable injector valve which can result in a compact and mechanically simple disposable assembly. It is in particular advantageous when the injector valve is biased for disabling connection of the water inlet of said eductor with the concentrated liquid food inlet of said eductor. In this manner the connection is disabled in case no external force is exerted on the injector valve as a result of which contamination of the concentrated liquid food product can be prevented. Biasing of the injector valve can e.g. be realized by elastic means, such as springs, or any other known biasing means.

An improved prevention of contamination can then be obtained when the injector valve is arranged for enabling connection of the holder to the liquid food product outlet of said eductor when the injector valve is enabling connection of the water inlet of said eductor with the water connection of the disposable assembly and for disabling connection of the holder to the foamed food product outlet of said eductor, when the injector valve is enabling connection of the water inlet of said eductor with the water connection of the disposable assembly, respectively. In this manner flushing of the eductor and microfiltration device is possible.

A very compact embodiment of a disposable assembly according to the present invention can be obtained when the converging nozzle is configured as the injector valve.

The invention further relates to a system for preparing a foamed food product, said system comprising a product preparation apparatus for preparing said foamed food product and a disposable assembly according to the invention, said product preparation apparatus comprising a water source, a heater for heating water, means for pressurizing water, said means being configured for detachable connection to the water connection of the disposable assembly for supplying water to the water inlet of the eductor of the disposable assembly, a source of pressurized gas, said source of pressurized gas being configured for detachable connection to the gas connection of said disposable assembly for supplying pressurized gas to the gas inlet of the microfiltration device. The water source of the product preparation apparatus can e.g. be a water reservoir or can be formed by a connection to the water mains. This system is a particularly user-friendly system in that the operative connection of the disposable assembly to the product preparation apparatus can be realized quickly and reproducibly and furthermore the system can be easily designed to dispense product in a reliable, hygienic manner.

In a particular embodiment of a system for preparing a foamed food product according to the invention said heater for heating water is configured to heat water to a temperature in a range between 60° C. to 110° C., preferably 90° C. to 98° C., more preferred 95° C. to 98° C. In contrast to steam injected in the liquid product before it enters the microfiltration device as described in WO-A1-2011/028117, the heater according to this embodiment requires significantly less energy for heating the water, while still being able to reproducibly produce a foamed food product at an elevated temperature. In comparison to the use of steam a foamed food product can be obtained without a cooking taste, which appears to be quite appealing for at least some of the consumers. In addition, according to a further embodiment of the invention, it is possible to correctly obtain a foamed food product by using means for pressurizing water which is configured to pressurize water in a range between 0.1 to 0.2 MPa. In comparison with existing product preparation apparatuses such a pressure is relatively low and can be realized at relatively low costs.

In an embodiment of a system for preparing a foamed food product according to the invention, the system comprises means for providing a constant gas flow to the microfiltration device, said means preferably being formed by a reducing valve. These means can be part of the product preparation apparatus and/or be a part of the disposable assembly. In a further embodiment of a system for preparing a foamed food product according to the invention, the source of pressurized gas is configured to supply pressurized gas at a slight overpressure, the overpressure preferably being in a range between 0.101 to 0.15 MPa, wherein the source of pressurized gas comprises a gas holder with a continuous gas pump or a compressor for providing a gas flow of 0.05 to 1.2 N Nliters/min, preferably 0.05 to 0.4 Nliters/min, more preferred 0.15 to 0.4 Nliters/min, most preferred 0.2 to 0.3 Nliters/min, and a reducing valve. In this manner a sufficient gas flow rate can be obtained to introduce gas via the microfiltration device into the product by using relatively low cost means using a relatively low amount of energy. Preferably the reducing valve comprises an orifice having a diameter in a range between 0.03 mm and 0.3 mm, preferably between 0.05 and 0.1 mm so that a constant gas flow rate can be generated.

In a still further embodiment of a system for preparing a foamed food product according to the invention, the product preparation apparatus comprises an operating device for controlling the operation of the source of pressurized gas, a sensor for detecting connection and disconnection, respectively, of the source of pressurized gas to the gas connection of said disposable assembly, and for supplying a signal indicative of said connection and disconnection, respectively, to the operating device, said operating device being configured for continuously activating said source of pressurized gas between said detected connection to and said detected disconnection from said gas connection of said disposable assembly. In this manner not only a sterile gas can be supplied to the product via the microfiltration device when preparing a foamed food product, but also a sterile gas is constantly supplied to keep the system under constant sterile (slight) overpressure. This decreases the risk of growth of microorganisms significantly which can result in a concentrated liquid food product that will maintain its sterility over extended periods of time, even under ambient conditions.

Alternatively or additionally the risk of growth of microorganisms can be reduced significantly in an embodiment of a system for preparing a foamed food product according to the invention that comprises a disposable assembly having an injector valve, wherein the means for pressurizing water of the product preparation apparatus comprises an injector valve actuator, said injector valve actuator being arranged for engaging the injector valve when the means for pressurizing water are connected to the water connection of the disposable assembly, said injector valve actuator being operable for positioning the injector valve in an enabling position for enabling connection of the water inlet of said eductor with the water connection of the disposable assembly and for positioning the injector valve in a disabling position for disabling connection of the water inlet of said eductor with the water connection of the disposable assembly, respectively. It is then in particular advantageous from a point of view of preventing contamination of the concentrated liquid food product in the disposable assembly when the injector valve actuator is operatively connected to the operating device. In this manner it is possible to disable and enable connection of the water inlet of said eductor with the water connection of the disposable assembly, respectively, after means for pressurizing water of the product preparation apparatus have been connected to the water connection of the disposable assembly for supplying water to the water inlet of the eductor of the disposable assembly.

In a further embodiment of a system for preparing a foamed food product according to the present invention, the operating device is arranged for controlling the operation of the heater for heating water and the means for pressurizing water, said operating device being arranged for operating the injector valve actuator for positioning the injector valve in the enabling position a predetermined time period after the operating device has controlled the heater to heat water and has controlled the means for pressurizing water to pressurize the water. In this manner it is possible to—in use—supply only heated or hot water to the eductor of the disposable assembly which avoids or reduces the presence or growth of microorganisms. The predetermined time limit is set in such a manner that a sufficient heating of the water is obtained and is amongst other things dependent on the particular kind of heater used and the amount of water to be heated.

In order to be able to prevent that relatively cold water can come into contact with the eductor after a serving of foamed food product has been prepared by the system, which cold water could undesirably lead to contamination, in an embodiment of a system for preparing a foamed food product according to the invention, the operating device is arranged for operating the injector valve actuator for positioning the injector valve in the disabling position a predetermined time period before the operating device deactivates the heater and the means for pressurizing water. In this manner it can be realized that the injector valve closes off the connection while the water supplied to the injector valve is still heated or hot.

Preferably the product preparation apparatus is free of any cooling devices for the disposable assembly. Since the overpressure is a slight overpressure, it can be produced by relatively low cost devices and with a relatively low amount of energy. If the sterile overpressure is maintained only during a part of the total time period in which the disposable assembly is connected to the product preparation apparatus, the time period within which the concentrated liquid food product maintains its sterility will reduce but can still be longer than compared with the situation in which no sterile overpressure is used at all. In comparison with the energy consumption of a system disclosed in WO-A1-2011/028117, the energy consumption of the present inventive system is significantly reduced, while at the same time a product with a more appealing taste can be provided at a strongly reduced cleaning frequency.

The invention is in particular advantageous in case of a system for preparing a foamed food product wherein the product preparation apparatus is configured to prepare a foamed food product, such as a milk foam or froth having a temperature in a range generally between 50° C. to 85° C., more preferred between 60° C. and 70° C., most preferred in a range between 65° C. to 68° C.

The invention also relates to a method for preparing a foamed food product utilizing a system according to the invention, wherein said method comprises the step of connecting said disposable assembly to said product preparation apparatus, the step of heating and pressurizing water and the step of supplying said heated water to the water inlet of said eductor for entraining concentrated liquid food product out of the holder and for mixing said concentrated liquid food product with the heated water. In this way the eductor is used to entrain concentrated liquid food product out of the holder by the suction provided by the water flowing through the eductor, so that no additional devices are necessary to expel the concentrated liquid food product from the assembly.

In an embodiment of a method for preparing a foamed food product according to the invention by which the risk of growth of microorganisms can be reduced significantly, the method comprises the step of enabling connection of the water inlet of said eductor with the water connection of the disposable assembly between the step of heating and pressurizing water and the step of supplying said heated water.

In a preferred embodiment of a method according to the invention, the method comprises the step of heating water to such a temperature and supplying said heated water at such a pressure to the water inlet of said eductor that concentrated liquid food product is entrained out of the holder at such an amount that after mixing with the heated water a liquid food product with a substantially normal amount of dry matter, or normal amount of liquid content is obtained. In this manner, it is possible to obtain a liquid food product with a normal liquid content from a concentrated liquid food product by just adjusting the temperature and the pressure of the supply of water. In this particularly advantageous use the eductor makes it possible to add such an amount of water to the concentrated liquid food product that after mixing with the water a liquid food product with a substantially normal liquid content, also called an unconcentrated liquid content herein, is obtained. This provides the possibility to prepare a foamed food product having a particularly pleasant taste sensation.

When as concentrated liquid food product concentrated milk is used having 20 wt % dry matter to 30 wt % dry matter, preferably 23-27 wt % dry matter, it is particularly advantageous to use a method according to the invention wherein water is heated to a temperature in a range between 60° C. to 110° C., preferably 90° C. to 98° C., more preferred 95° C. to 98° C. and wherein the heated water is pressurized to a range between 0.11 and 2.5 MPa, preferably between 0.2 and 0.4 MPa and then is supplied to the water inlet of the eductor. In this manner with a relatively low amount of energy a heated milk product having a temperature in a range between 60° C. and 70° C., preferably in a range between 65° C. to 68° C., can be produced without the "cooked milk taste".

In an other embodiment of a method according to the invention, the method comprises the step of keeping said disposable assembly at ambient temperature. By using a disposable assembly for a concentrated liquid food product, it is possible to store the disposable assembly during transport and use for an extended period of time at ambient temperatures, i.e. without cooling, without degradation of the concentrated liquid food product.

In a further embodiment of a method according to the invention, in which the method comprises the step of supplying gas to the microfiltration device under a pressure of 0.101 to 0.15 MPa and with a gas flow of 0.05 to 1.2 Nliters/min, preferably 0.05 to 0.4 Nliters/min, more preferred 0.15 to 0.4 Nliters/min, most preferred 0.2 to 0.3 Nliters/min, a stable foamed product can be prepared using a relatively low amount of energy. A very reproducible, stable foamed product can preferably be obtained when the step of supplying said gas under pressure to the microfiltration device comprises the step of supplying gas at a constant rate to the microfiltration device. Preferably gas is supplied via a small orifice. In addition, in this manner the generation of a foamed food product has proven to be less dependent on fluctuations in flow of product through or over the microfiltration device. The generation of a foamed food product has proven to be even more independent on fluctuations in flow of product through or over the microfiltration device when the diameter of the orifice is such as to create a (near) supersonic gas flow through the orifice, and/or the diameter of the orifice is such that in dependence on the morphology and dimensions of the microfiltration device a required effective pressure over the filtration surface of the filtration device for generating a foamed product is obtained.

Preferably the gas is an inert gas, for example containing air, nitrogen or carbon dioxide.

The risk of growth of microorganisms can be further reduced significantly in a method according to the invention when the method comprises the step of deactivating heating of water and deactivating pressurization of water and when the method furthermore comprises the step of disabling the connection of the water inlet of said eductor with the water connection of the disposable assembly before the step of deactivating the heating and deactivating the pressurization of the water.

In a still further embodiment of a method according to the invention, the method comprises the step of disconnecting the gas source from said disposable assembly and wherein the step of supplying said gas under pressure is performed continuously between the moment of connecting the gas source to the disposable assembly and the moment of disconnecting the gas source from said disposable assembly. In this manner a constant sterile overpressure is maintained which decreases the risk of growth of microorganisms significantly. This can result in a concentrated liquid food product that maintains its sterility over extended periods of time, even under ambient conditions. Consequently, a very hygienic preparation of foamed food products can be realized.

BRIEF DESCRIPTION OF THE DRAWINGS

The invention will be further explained with reference to the Figures, in which non-limiting exemplary embodiments of a disposable assembly and a system for preparing a foamed food product in accordance with the invention are shown. In the drawing.

DETAILED DESCRIPTION OF EXEMPLARY EMBODIMENTS

Figure 1:
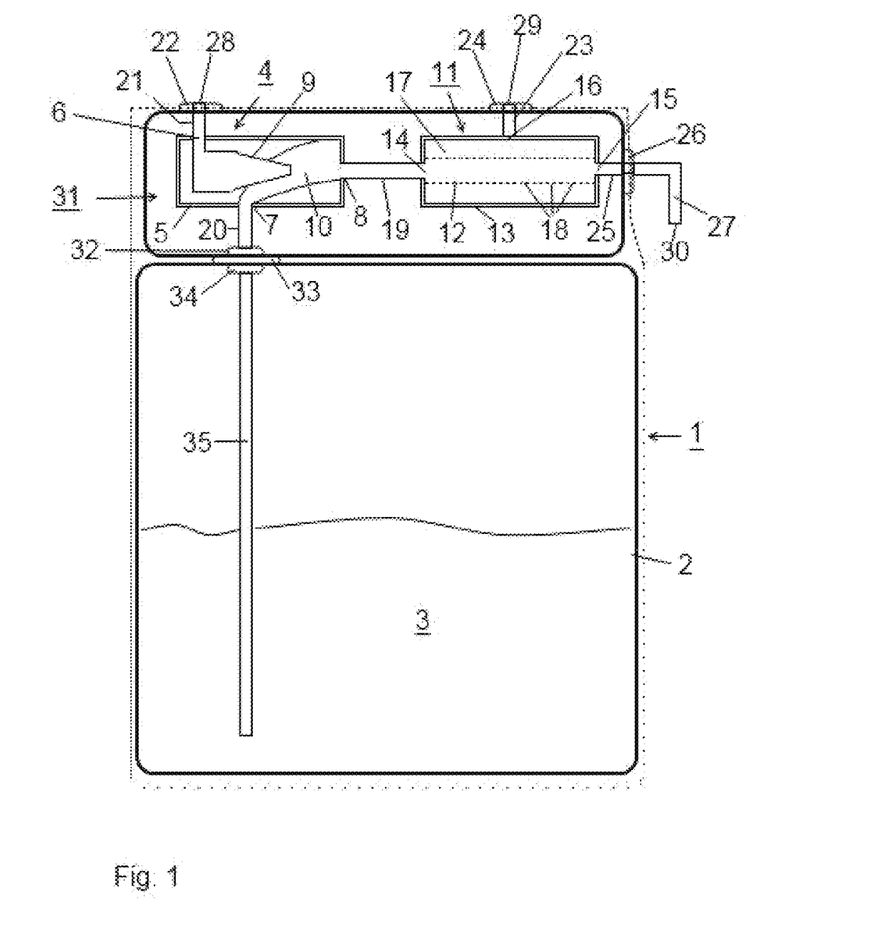
FIG. 1 shows a schematic view in cross section of a disposable assembly according to an exemplary embodiment of the invention.

In FIG. 1 a schematic view in cross section of a disposable assembly 1 according to an exemplary embodiment of the invention is shown. The disposable assembly 1 comprises a holder 2 which in this Example is designed to contain a maximum amount of 4 liters of milk 3 in concentrated form. This concentrated milk comprises 20 wt % dry matter to 30 wt % dry matter, preferably 23-27 wt % dry matter, whereas milk with a normal water content, which latter is also called unconcentrated milk herein, comprises 10 wt % dry matter. Please note that, although the invention will be explained with respect to milk as (concentrated) liquid food product, the invention can also be applied to other concentrated liquid food products, for instance, (fruit) juice/drink, an alcohol-containing drink or drink base, for instance, beer or wine, a dairy or dairy-based drink, for instance, a whey drink or permeate-based drink, (milk) shake, chocolate drink, (drinking) yoghurt, sauce, ice cream, dessert, or other products, but is in particular intended to provide a milk food product. The product can further comprise, for instance, vegetal or animal fat or oil, a thickener, sugar, sweeteners, flavoring, coloring and/or the like, and/or various other ingredients. The product could even comprise, for instance, a non-consumable product, a body care product, a hair treating agent, or the like. In addition the maximum amount of milk contained in the holder can in other embodiments of the invention amount to 2 to 5 liters for professional use and 0.5 to 1 liter for home use and the concentrated milk can in other embodiments comprise 20 wt % dry matter to 30 wt % dry matter, preferably 23-27 wt % dry matter.

In the following, air is discussed as the gas to be supplied to the microfiltration device, however, according to an alternative embodiment, the gas can comprise, for instance, an inert gas or another gas or gas mixture, for example containing nitrogen or carbon dioxide.

The disposable assembly 1 furthermore comprises an eductor 4 having a housing 5 with a water inlet 6, a concentrated liquid food inlet 7 and a liquid food product outlet 8. The concentrated liquid food inlet 7 of the eductor 4 is positioned between the water inlet 6 and the liquid food product outlet 8. Within the housing 5 of the eductor 4 a converging nozzle 9 is present which is in direct communication with the water inlet 6 and a mixing chamber and a low pressure zone 10 which are in direct communication with the liquid food product outlet 8 of the eductor 4.

The disposable assembly 1 is in addition provided with a microfiltration device 11 comprising a (tubular) microfiltration wall 12 having air transmissive pores and a housing 13 surrounding the tubular microfiltration wall 12. In the shown embodiment the housing 13 and the tubular microfiltration wall 12 are positioned coaxial with respect to one another and an air supply space 17 is formed between the tubular microfiltration wall 12 and the housing 13. The microfiltration device 11 comprises a product inlet opening 14 and, in the embodiment shown in the drawing, an outlet opening 15 opposite the product inlet opening 14. Please note that in other embodiments the inlet and the outlet can be positioned differently to each other. Furthermore, an air opening 16 is in communication with the air supply space 17. In the shown embodiment the air transmissive pores 18 have a pore size of 0.6 micron, but in alternative embodiments the pore size can be in the range of 0.05-10 microns, in particular in a range between 0.1 micron and 2 microns, more particularly a range between 0.2 micron and 1.5 microns. In the present embodiment the tubular microfiltration wall 12 is made of a hydrophobic material, such as polypropylene (PP), which in combination with the air transmissive pores 18 of the mentioned dimensions ensures that the tubular microfiltration wall 12 functions as a HEPA filter. The use of hydrophobic material ensures that no water or moist, possibly with microorganisms embedded therein, stick to the wall 12, which leads to an improved hygiene during transport and use. In the shown embodiments the eductor 4 and the housing 13 are also made of a hydrophobic material, but it will be clear that in other embodiments other materials can be used. Please note that in the exemplary embodiment, the product feed-through channel is surrounded by the microfiltration wall and the air supply space is at the outside of the microfiltration wall. In an alternative embodiment the product feed-through channel can be positioned outside the microfiltration wall, while the air supply space is formed by the space surrounded by this wall. In addition the microfiltration device can be designed in various other manners.

In the disposable assembly 1 a transfer tube 19 connects the outlet 8 of the eductor 4 with the product inlet opening 14 of the microfiltration device 11. Furthermore, a concentrated liquid food product tube 20 connects the holder 2 to the concentrated liquid food inlet 7 of the eductor 4 and a water inlet tube 21 connects the water inlet 6 of the eductor 4 with a water connection 22 of the disposable assembly 1. This water connection 22 is configured for connection to an external source of water, preferably a source of hot water under pressure. Please note that with "external source of water" a water source external in relation to the assembly is meant. An air inlet tube 23 connects the microfiltration device 11 to an air connection 24 of the disposable assembly 1, which air connection 24 is configured for connection to an external source of air, preferably an external source of air under (slight) overpressure. As shown in FIG. 1, a foamed food product outlet tube 25 connects the outlet opening 15 of the microfiltration device 11 to an outlet connection 26 of the disposable assembly 1 for discharging a foamed food product created by the microfiltration device 11 from the disposable assembly 1. In the shown embodiment the outlet connection 26 is provided with an optional discharge spout 27, and all the tubes and connections are made of hydrophobic material. The connections 22, 24 and the spout 27 (or the connection 26) are closed off by an aseptic seal 28, 29 and 30, respectively. These aseptic seals are designed to be opened by any means known in the art.

In the embodiment shown in FIG. 1, the eductor 4, the microfiltration device 11, the transfer tube 19, the concentrated liquid food product tube 20, the water inlet tube 6, the water connection 22, the air inlet tube 16, the air connection 24, the foamed food product outlet tube 25 and the outlet connection 26 (and optionally the spout 27) are assembled as one unit 31. This unit 31 is by said concentrated liquid food product tube 20 connected to a concentrated liquid food product connection 32, which liquid food product connection 32 is detachably connected by an intermediate piece 33 to an outlet connection 34 of the holder 2. From the outlet connection 34 a supply tube 35 extends downward into the concentrated milk 3. Please note, that in a non-shown embodiment of the invention this unit can also form an integral part of the product preparation unit.

In an alternative embodiment of the invention the unit 31 and the holder 2 can be integrated into one piece, in which—when compared to FIG. 1—the concentrated liquid food product tube 20 also forms the supply tube 35 and the connections 32, 34 and the piece 33 need not be present. In addition, the present invention also relates to a disposable assembly as described above and as described in the enclosed claims without the concentrated liquid food product being present, since this product can be introduced in the holder 2, e.g. via the outlet connection 34.

Figure 2:
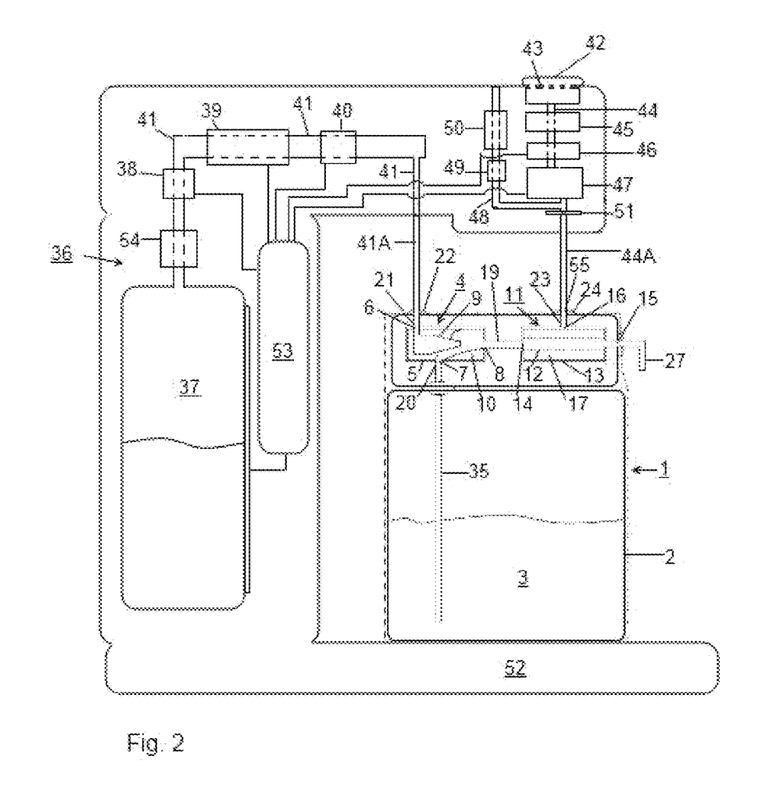
FIG. 2 shows a schematic view in cross section of a system for preparing a foamed food product according to an exemplary embodiment of the invention.

In FIG. 2 a schematic view in cross section of a system for preparing a foamed food product according to an exemplary embodiment of the invention is shown. The system comprises a product preparation apparatus 36 for preparing a foamed food product and a disposable assembly 1 according to the invention.

In the product preparation apparatus 36 a water reservoir 37 is provided as well as a pump 38 as a means for pressurizing water. From the water reservoir 37 a water line 41 runs through the product preparation apparatus 36 and, in this Example, has an extension 41A which is configured for detachable connection to the water connection 22 of the disposable assembly 1 for supplying water to the water inlet 6 of the eductor 4 of the disposable assembly 1. The water line 41 runs through an optional particle filter 54, a heater 39 for optionally heating water and passes an optional flow meter 40 for measuring the flow of the water coming from the reservoir 37.

Please note, that in other embodiments the water source could be provided by a connection to the water mains.

In the product preparation apparatus 36 also a source of air 42, in this case an opening in the product preparation apparatus 36 to the ambient atmosphere, is provided in which the opening is closed off by a grid 43 for preventing larger particles passing the opening. From the source of air 42 an air line 44 runs through the product preparation apparatus 36 and, in this example, has an extension 44A which is configured for detachable connection to the air connection 24 of the disposable assembly 1 for supplying air to the air inlet 16 of the microfiltration device 11 of the disposable assembly 1. The air line 44 passes through an optional particle filter 45 for filtering the air and through an air compressor 46 as means for pressurizing air to a slight overpressure. In this embodiment air from the air compressor is buffered in an air buffer tank 47, which is via a vent line 48, a relief valve 49 and a silencer 50 connected to the ambient atmosphere. In another embodiment in stead of an air compressor and a buffer tank a continuous air pump can be used to supply air to the microfiltration device.

In the air line a reducing valve 51 is provided comprising an orifice having, in this embodiment, a diameter of 0.07 mm for generating a constant air flow. Please note, that in other embodiments the diameter of the orifice can be within a range between 0.03 mm and 0.3 mm.

The product preparation apparatus 36 as shown in FIG. 2 can be free of any cooling devices for the disposable assembly 1, which is supported within the product preparation apparatus 36 on a platform 52.

The product preparation apparatus 36 further comprises an operating device 53, e.g. a microprocessor, for controlling the operation of the product preparation apparatus 36 (for this, the operating device 53 is via lines connected to the air compressor 46 for controlling its operation); the air buffer tank 47 for retrieving the air pressure within the air buffer tank; the water reservoir 37 for retrieving the water level within the reservoir; the water pump 38 and the heater 39 for controlling their operation; and the flow meter 40 for retrieving information on the water flow. In addition the operating device 53 is connected to a sensor 55 for detecting connection and disconnection, respectively, of the air extension 44A to the air connection 24 of the disposable assembly 1. This sensor 55 is designed for supplying a signal indicative of said connection and disconnection, respectively, to the operating device 53.

In order to be able to perform the inventive method, which shall be described later, the operating device 53 is configured for (continuously) activating the air compressor 46 between a detected connection to and a detected disconnection from said air connection 24 of the disposable assembly 1, as detected by the sensor 55. The heater 39 used in the apparatus 36 is configured to heat water to a temperature in a range between 60° C. to 110° C., preferably 90° C. to 98° C., more preferred 95° C. to 98° C. Furthermore, the water pump 38 is configured to pressurize water in a range between 0.1 to 0.2 MPa. Please note, that this is a relatively slight overpressure which could in an alternative embodiment also be provided by a connection water mains alone. The air compressor 46 is configured to pressurize air to a slight overpressure, preferably in a range between 0.101 to 0.15 MPa and for providing an air flow of 0.05 to 1.2 Nliters/min, preferably 0.05 to 0.4 Nliters/min, more preferred 0.15 to 0.4 Nliters/min, most preferred 0.2 to 0.3 Nliters/min. In this manner, the product preparation apparatus 36 can be properly configured to prepare a foamed food product, such as a milk foam or froth having a temperature in a range between 60° C. and 70° C., preferably in a range between 65° C. to 68° C.

Now an embodiment of an inventive method for preparing a foamed food product utilizing the system as shown in FIG. 2 will be described. In an initial step the disposable assembly 1 containing concentrated milk having 20 wt % dry matter to 30 wt % dry matter, preferably 23-27 wt % dry matter is connected to the product preparation apparatus 36, wherein the water extension 41A is connected to the water connection 22 and the air extension 44A is connected to the air connection 24, during which connection the aseptic seals are perforated. The sensor 55 detects this connection and sends an appropriate signal indicating this connection to the operating device 53, which activates the air compressor 46 for (continuously) supplying air under a slight overpressure to the air supply space 17 around the tubular microfiltration wall 12. The operating device 53 operates to product preparation apparatus 36 to supply air via the orifice 51 to the microfiltration device 11 under a pressure of 0.101 to 0.15 MPa and with an air flow of 0.05 to 1.2 Nliters/min, preferably 00.5 to 0.4 Nliters/min, more preferred 0.15 to 0.4 Nliters/min, most preferred 0.2 to 0.3 Nliters/min. This slight overpressure creates a so-called sterile air curtain which decreases the risk of growth of microorganisms within the disposable assembly significantly which results in a foamed food product that will maintain its sterility over extended periods of time, even under ambient conditions. Since the overpressure is a slight overpressure, it can be produced by relatively low cost devices and with a relatively low amount of energy. Consequently, a very hygienic preparation of foamed food products can be realized. The air flow to be used for good results is dependent on the diameter of the tubular microfiltration wall and the desired flow rate of the prepared product.

If a consumer wants to obtain a serving of milk froth, or another product in other embodiments, he or she pushes an activation button (not shown in FIG. 2) upon which the operating device 53 activates the heating of the water to a temperature of 95° C. to 98° C. and pressurizing the water to a pressure of 0.3 MPa by activating the pump 38 and the heater 39, respectively. When the water is sufficiently heated then the operating device 36 operates the product preparation apparatus 36 to supply the heated water to the water inlet 6 of the eductor 4. When the water emerges from the converging nozzle 9 it creates suction for entraining concentrated milk out of the holder 2 and the heated water and concentrated milk are mixed in the mixing chamber 10. By using such a water temperature and water pressure, concentrated milk is entrained out of the holder 2 at such an amount that after mixing with the heated water a liquid food product with a substantially normal amount of dry matter, or normal amount of liquid content is obtained. The disposable assembly 1 is kept at ambient temperature and does not require any cooling. Furthermore, in other embodiments, pressurizing the water can be done to a pressure in a range between 0.11 to 2.5 MPa.

The air present in the air supply space 17 has a pressure which is higher than the pressure of the milk flowing from the product inlet opening 14 to the outlet opening 15. The air present in the air supply space 17 enters the milk uniformly via the pores so that fine air bubbles are homogeneously introduced into the milk for the purpose of foam formation. Finally, the produced milk foam is discharged via the spout 27. In this manner, when milk is supplied to the microfiltration device, it is possible to inject air in the milk in a sterile manner, since the microfiltration device 11 with such transmissive pores and in particular when manufactured from hydrophobic material, such as PP functions as a HEPA filter, leading to a very hygienic manner of preparing the milk foam. Furthermore, adding air to the milk in this way can provide a highly stable, attractive foam, in particular of a constant quality, in a relatively simple manner for a desired period of time. With various foamable products, moreover, a particularly high overrun (degree of aeration) can be obtained.

After the serving of milk foam is discharged, the operating device closes the injector valve, deactivates the water heater and the water pump, but still keeps the air compressor 46 activated to continuously supply air under overpressure to the microfiltration device. This overpressure air expels possible remains from the spout 27 and prevents microorganisms entering the inside of the disposable assembly 1. Only when the disposable assembly 1 is empty and the sensor 55 detects disconnection of the air extension 44A from the air connection 24 then the operating device 53 deactivates the air compressor 46.

In this manner a single disposable assembly 1 which is aseptically filled with a content of 4 liter concentrated milk can be used to deliver an amount of milk foam servings for a regular restaurant for seven days, whilst being uncooled, i.e. kept at ambient temperatures and without any cleaning required during that period. Thus the inventive method and system can provide a foamed food product preparation with a minimum of energy consumption, a minimum of handling for the user (refilling and cleaning) and a maximum operation time.

Figure 3:
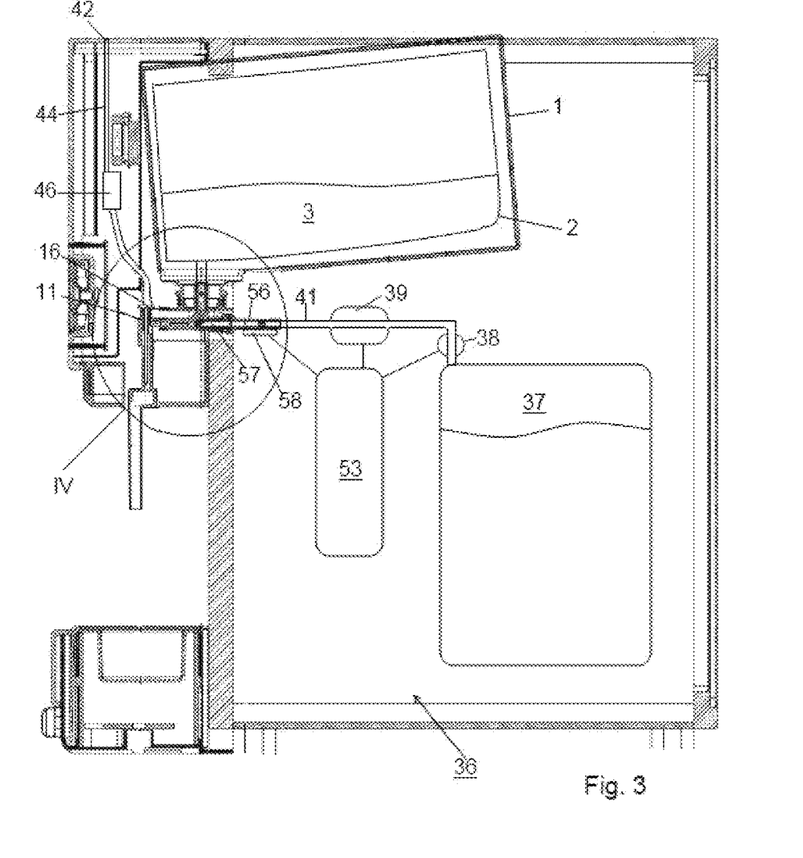
FIG. 3 shows a schematic view in cross section of another embodiment of a system for preparing a foamed food product according to the invention in which the disposable assembly comprises an injector valve.
Figure 4:
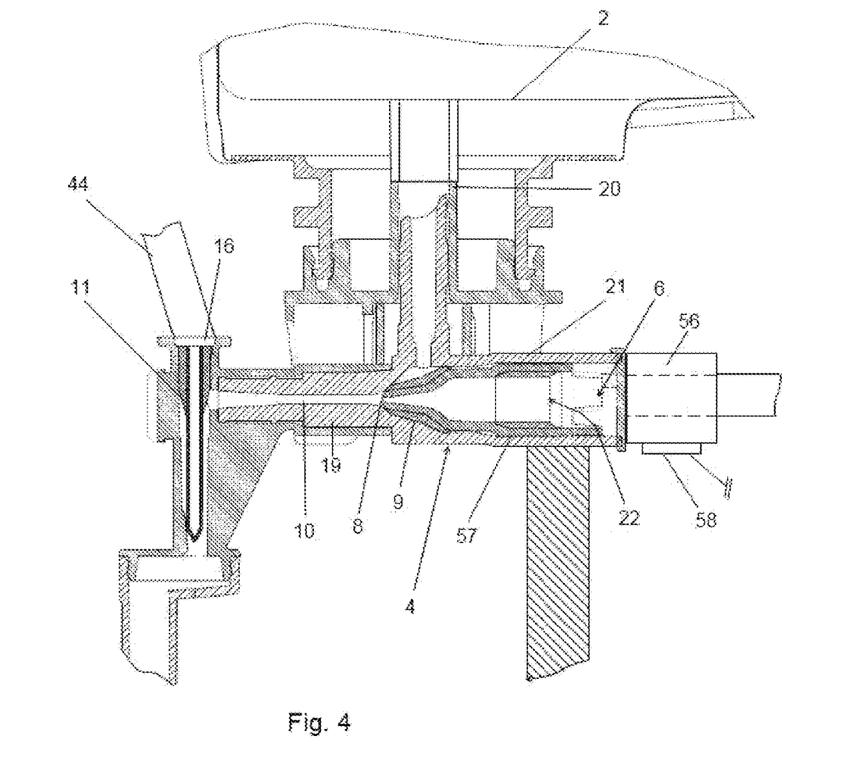
FIG. 4 shows a detail of FIG. 3 on an enlarged scale.

In FIGS. 3 and 4 other embodiments of a system for preparing a foamed food product according to the invention are schematically shown in cross section, in which the product preparation apparatus 36 comprises an injector valve actuator 56, and in which the disposable assembly 1 comprises an injector valve 57.

The disposable assembly 1 comprises a holder 2 which in these Examples are designed to contain a maximum amount of 4 liters of milk 3 in concentrated form. The disposable assembly 1 furthermore comprises an eductor 4, a water inlet 6, a concentrated liquid food inlet 7 and a liquid food product outlet 8. A converging nozzle 9 is present which is in direct communication with the water inlet 6 and a mixing chamber and a low pressure zone (e.g. formed by a diffuser or venture) 10 which are in direct communication with the liquid food product outlet 8 of the eductor 4.

The disposable assembly 1 is in addition provided with a microfiltration device 11 with an air opening 16.

In the disposable assembly 1 a transfer tube 19 connects the outlet 8 of the eductor 4 with the product inlet opening of the microfiltration device 11. Furthermore, a concentrated liquid food product tube 20 connects the holder 2 to the concentrated liquid food inlet 7 of the eductor 4 and a water inlet tube 21 connects the water inlet 6 of the eductor 4 with a water connection 22 of the disposable assembly 1. This water connection 22 is configured for connection to an external source of water 37 via a water line 41.

The air opening 16 of the disposable assembly 1 is configured for connection to an external source of air via an air line 44 in which an air compressor 46 is incorporated.

In the product preparation apparatus 36 the water reservoir 37 is provided as well as the pump 38 as a means for pressurizing water. From the water reservoir 37 the water line 41 runs through the product preparation apparatus 36 and is configured for detachable connection to the water connection 22 of the disposable assembly 1 for supplying water to the water inlet 6 of the eductor 4 of the disposable assembly 1.

In the product preparation apparatus 36 also the source of air 42, in this case an opening in the product preparation apparatus 36 to the ambient atmosphere, is provided in which the opening is closed off by a grid for preventing larger particles passing the opening. From the source of air 42 the air line 44 runs through the product preparation apparatus 36 and is configured for detachable connection to the air inlet or opening 16 of the disposable assembly 1 for supplying air to the air inlet 16 of the microfiltration device 11 of the disposable assembly 1.

The product preparation apparatus 36 further comprises an operating device 53, e.g. a microprocessor, for controlling the operation of the product preparation apparatus 36. For this, the operating device 53 is via lines connected to the relevant devices or components of the apparatus 36.

The injector valve actuator 56 is part of the means for pressurizing water of the product preparation apparatus 36 and is arranged for—after connection of the disposable assembly 1 to the product preparation apparatus 36—engaging the injector valve 57, i.e. when the means for pressurizing water are connected to the water connection of the disposable assembly. The injector valve actuator 56 is operatively connected via a driver 58 and lines to the operating device 53, and the injector valve actuator 56 is in this embodiment rotatable under control of the operating device 53.

Figure 5A:
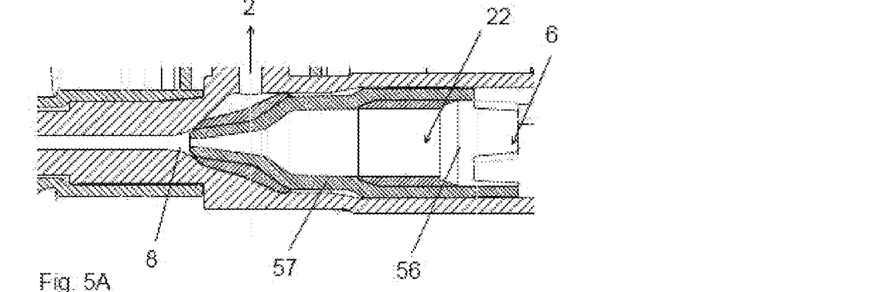
FIG. 5A shows the injector valve in disabling position, disabling connection of the water inlet of said eductor with the water connection of the disposable assembly.
Figure 5B:
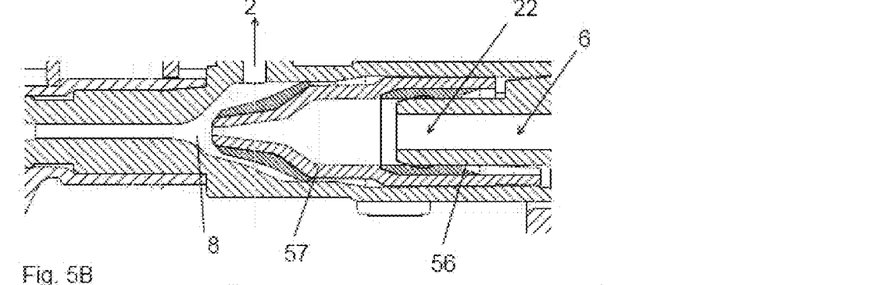
FIGS. 5B and 5C both show the injector valve in enabling position, enabling connection of the water inlet of said eductor with the water connection of the disposable assembly, the injector valve in FIG. 5B being in an enabling position enabling connection of the holder to the liquid food product outlet of said eductor, and the injector valve in FIG. 5C being in an disabling position disabling connection of the holder to the liquid food product outlet of said eductor.
Figure 5C:
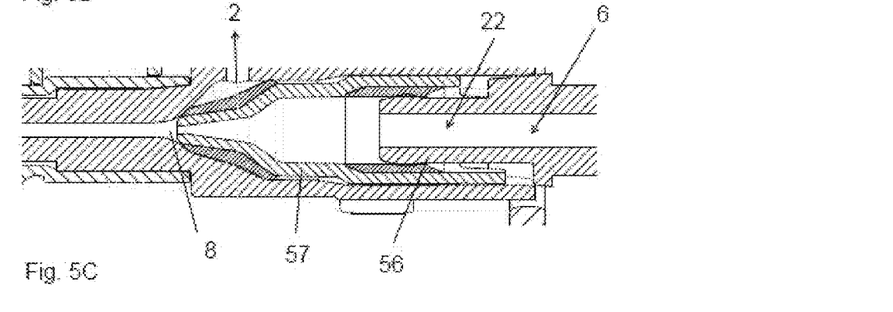

The injector valve actuator 56 is—after connection of the disposable assembly to the product preparation apparatus—in engagement with the injector valve 57 and is operable under control of the operating device 53 for positioning the injector valve 57 either in an enabling position for enabling connection of the water inlet 6 of the eductor 4 with the concentrated milk connection of the disposable assembly 1 (as shown in FIG. 5B) or for positioning the injector valve 57 in a disabling position (as shown in FIGS. 5A and 5C) for disabling connection of the water inlet of said eductor with the concentrated milk connection of the disposable assembly.

In the embodiment shown in FIGS. 3 and 4 the injector valve 57 is a rotatable injector valve and is in addition configured such, e.g. by providing suitably positioned openings, as to also enable connection of the holder 2 to the liquid food product outlet 8 of the eductor 4 when the injector valve 57 is enabling connection of the water inlet 6 of the eductor 4 with the water connection 22 of the disposable assembly 1 (as shown in FIG. 5B) and for disabling connection of the holder 2 to the liquid food product outlet 8 of the eductor 4 (as shown in FIG. 5C) when the injector valve 57 is enabling connection of the water inlet 6 of the eductor 4 with the water connection 22 of the disposable assembly 1, respectively. In the position as indicated in FIG. 5C it is possible to perform flushing without concentrated liquid food product being entrained out of the holder. As indicated in the FIGS. 3 to 5 the injector valve 57 is also configured to be converging.

During operation of the system for preparing a foamed food product, the operating device 53 first controls the operation of the heater 39 for heating water and the means for pressurizing water, in particular the pump 38, such that the water can be heated up to a desired temperature. A predetermined time period after the operating device 53 has activated the heater 38 and the pump 38 the operating device 53 activates the injector valve actuator 56 into rotation so that the injector valve 57, which is biased in the disabling position, is rotated to the enabling position by engagement with the injector valve actuator 56. Then the heated water, which has already been pressurized, is passed to the eductor 4 and by enabling the connection to the holder, concentrated liquid food product 3 is entrained out of the holder. Thereafter the same process takes place is described with reference to FIGS. 1 and 2. After a serving of the foamed food product, i.e. in this case milk froth, has been dispensed, the operating device 53 controls the injector valve actuator 56 for rotating the injector valve 57 in the disabling position first, and a predetermined time period thereafter, e.g. a time period of between 2 to 10 seconds, deactivates the heater 39 and the pump 38, and optionally the air compressor 46.

The invention can prepare hot pourable foams, for instance, cappuccino, latte macchiato and other hot milk drinks, with or without flavor additions. In a further elaboration, to that end, the product is foamed to a minimum overrun of 10% and obtains/has immediately after dispensing a temperature between 50 and 85° C., preferably between 60 and 70° C. and most preferably between 65 and 68° C. The product may be, for instance, predominantly pourable (for instance, with an overrun lower than 100%).

Alternatively, the invention can prepare cold and ice-cold drinks, for instance, milk drink, milk shake, lunch drink, etc. In that case, the product can have, for instance, a minimum overrun of 10% and a temperature lower than 20° C., preferably a temperature between −5 and 10° C. The cold, dispensed product may be predominantly pourable and can e.g. comprise a sweet or, conversely, a salty product, a fermented milk product.

The invention is particularly well-suited to prepare ice cream or a (milk) shake. The ice cream or (milk) shake product can have an overrun in the range of 10%-200% and a temperature of 0° C. or lower (preferably a temperature in the range of −10° C. to −2° C.).

The invention can be used, for instance, such that a product mentioned undergoes an overrun that is greater than 100% (in particular 150% or more, and more particularly 200% or more), utilizing a relatively low pressure (in particular a pressure of air supplied to the air supply space mentioned, for instance, a pressure lower than 0.2 MPa. The invention can be used, for instance, such that a product mentioned undergoes an overrun that is greater than 100% (in particular 150% or more, and more particularly 200% or more), while the dispensed product has a relatively low temperature, for instance, a temperature of 0° C. or lower.

The invention claimed is:

1. A disposable assembly for a foamed food product, said disposable assembly comprising:
    a holder containing a concentrated liquid food product;
    an eductor;
    a microfiltration device including a tubular microfiltration wall having gas transmissive pores having a pore size in the range of 0.05-10 microns;
    a transfer tube connecting an outlet of said eductor with a product inlet of said microfiltration device;
    a concentrated liquid food product tube connecting said holder to a concentrated liquid food inlet of said eductor;
    a water inlet tube connecting a water inlet of said eductor with a water connection of the disposable assembly, said water connection being configured for connection to an external source of water under pressure, said concentrated liquid food inlet of said eductor being positioned between said water inlet and said outlet of said eductor;
    a gas inlet tube connecting said microfiltration device to a gas connection of said disposable assembly, said gas connection being configured for connection to an external source of gas under pressure; and
    a foamed food product outlet tube connecting an outlet of the microfiltration device to an outlet connection of the disposable assembly for discharging a foamed food product created by the microfiltration device of the disposable assembly.

2. A disposable assembly according to claim 1, wherein said eductor comprises a housing containing a converging nozzle being in direct communication with said water inlet of said eductor, a mixing chamber and a low pressure zone being in direct communication with said outlet of said eductor.

3. A disposable assembly according claim 1, wherein the microfiltration device is made of a hydrophobic material.

4. A disposable assembly according to claim 1, wherein the microfiltration device comprises means with a microfiltration surface having gas transmissive pores, said microfiltration device having a product inlet and a product outlet.

5. A disposable assembly according to claim 1, wherein said device comprising a product inlet opening and an outlet opening, said microfiltration device further comprising a housing surrounding said tubular microfiltration wall for forming a gas supply space between the tubular microfiltration wall and the housing, wherein said housing comprises a gas opening in communication with said gas inlet tube, said tubular microfiltration wall being made of hydrophobic material.

6. A disposable assembly according to claim 1, wherein the concentrated liquid food product is a milk based concentrate.

7. A disposable assembly according to claim 6, wherein the concentrated milk comprises 20 wt % dry matter to 30 wt % dry matter, preferably 23-27 wt % dry matter.

8. A disposable assembly according to claim 1, wherein the holder for containing said liquid food product in concentrated form comprises a concentrated liquid food product connection being configured for connection to said concentrated liquid food product tube, wherein said eductor, said microfiltration device, said transfer tube, said concentrated liquid food product tube, said water inlet tube, said water connection, said gas inlet tube, said gas connection, said foamed food product outlet tube and said outlet connection are assembled as one unit which is detachably connected by said concentrated liquid food product tube to said concentrated liquid food product connection, said unit being preferably made of hydrophobic material.

9. A disposable assembly according to claim 1, wherein at least one connection is closed off by an aseptic seal.

10. A disposable assembly according to claim 1, wherein said holder containing said liquid food product in concentrated form contains 0.5 to 1 liter; or 2 to 5 liters, preferably 3 to 4 liters of said liquid food product in concentrated form.

11. A disposable assembly according to claim 1, wherein the disposable assembly comprises means for providing a constant gas flow to the microfiltration device, said means preferably being formed by a reducing valve.

12. A disposable assembly according to claim 1, wherein the water inlet tube of the disposable assembly comprises an injector valve for enabling connection of the water inlet of said eductor with the water connection of the disposable assembly and disabling connection of the water inlet of said eductor with the water connection of the disposable assembly, respectively.

13. A disposable assembly according to claim 12, wherein the injector valve is a rotatable injector valve.

14. A disposable assembly according to claim 12, wherein the injector valve is arranged for enabling connection of the holder to the liquid food product outlet of said eductor when the injector valve is enabling connection of the water inlet of said eductor with the water connection of the disposable assembly and for disabling connection of the holder to the liquid food product outlet of said eductor when the injector valve is enabling connection of the water inlet of said eductor with the water connection of the disposable assembly, respectively.

15. A disposable assembly according to claim 12, wherein the converging nozzle is configured as the injector valve.

16. A disposable assembly according to claim 12, wherein the injector valve is biased for disabling connection of the water inlet of said eductor with the water connection of the disposable assembly.

17. A disposable assembly according to claim 1, wherein the gas transmissive pores have a pore size in the range of at least 0.1 micron and less than 2 microns.

18. A disposable assembly according to claim 17, wherein the gas transmissive pores have a pore size in the range at least 0.2 micron and less than 1.5 microns.

19. A system for preparing a foamed food product, said system comprising a product preparation apparatus for preparing said foamed food product and a disposable assembly according to claim 1, said product preparation apparatus comprising a water source, a heater for heating water, means for pressurizing water, said means for pressurizing water being configured for detachable connection to the water connection of the disposable assembly for supplying water to the water inlet of the eductor of the disposable assembly, a source of pressurized gas, said source of pressurized gas being configured for detachable connection to the gas connection of said disposable assembly for supplying pressurized gas to the gas inlet of the microfiltration device.

20. A system for preparing a foamed food product according to claim 19, wherein said heater for heating water is configured to heat water to a temperature in a range between 60° C. to 110° C., preferably 90° C. to 98° C., more preferred 95° C. to 98° C.

21. A system for preparing a foamed food product according to claim 19, wherein said means for pressurizing water is configured to pressurize water in a range between 0.1 to 0.2 MPa.

22. A system for preparing a foamed food product according to claim 19 wherein the system comprises means for providing a constant gas flow rate to the microfiltration device, said means preferably being formed by a reducing valve.

23. A system for preparing a foamed food product according claim 19, wherein the source of pressurized gas is configured to supply pressurized gas at a slight overpressure, the overpressure preferably being in a range between 0.101 to 0.15 MPa and wherein the source of pressurized gas comprises a gas holder with a continuous gas pump or a compressor for providing a gas flow of 0.05 to 1.2 Nliters/min, preferably 0.05 to 0.4 Nliters/min, more preferred 0.15 to 0.4 Nliters/min, most preferred 0.2 to 0.3 Nliters/min and a reducing valve.

24. A system for preparing a foamed food product according to claim 23, wherein the reducing valve comprises an orifice having a diameter in a range between 0.03 mm and 0.3 mm, preferably between 0.05 and 0.1 mm for generating a constant gas flow rate.

25. A system for preparing a foamed food product according to claim 19, wherein the product preparation apparatus comprises an operating device for controlling the operation of the source of pressurized gas, a sensor for detecting connection and disconnection, respectively, of the source of pressurized gas to the gas connection of said disposable assembly and for supplying a signal indicative of said connection and disconnection, respectively, to the operating device, said operating device being configured for (continuously) activating said source of pressurized gas between said detected connection to and said detected disconnection from said gas connection of said disposable assembly.

26. A system for preparing a foamed food product according to claim 25, wherein the injector valve actuator is operatively connected to the operating device.

27. A system for preparing a foamed food product according to claim 26, wherein the operating device is arranged for controlling the operation of the heater for heating water and the means for pressurizing water, said operating device being arranged for operating the injector valve actuator for positioning the injector valve in the enabling position a predetermined time period after the operating device has controlled the heater to heat water and has controlled the means for pressurizing water to pressurize the water.

28. A system for preparing a foamed food product according to claim 27, wherein the operating device is arranged for operating the injector valve actuator for positioning the injector valve in the disabling position a predetermined time period before the operating device deactivates the heater and the means for pressurizing water.

29. A system for preparing a foamed food product according to claim 19, comprising a disposable assembly wherein the water inlet tube of the disposable assembly comprises an injector valve for enabling connection of the water inlet of said eductor with the water connection of the disposable assembly and disabling connection of the water inlet of said eductor with the water connection of the disposable assembly, respectively, and wherein the means for pressurizing water of the product preparation apparatus comprises an injector valve actuator, said injector valve actuator being arranged for engaging the injector valve when the means for pressurizing water are connected to the water connection of the disposable assembly, said injector valve actuator being operable for positioning the injector valve in an enabling position for enabling connection of the water inlet of said eductor with the water connection of the disposable assembly and for positioning the injector valve in a disabling position for disabling connection of the water inlet of said eductor with the water connection of the disposable assembly, respectively.

30. A method for preparing a foamed food product utilizing a system according to claim 19, wherein said method comprises the step of connecting said disposable assembly to said product preparation apparatus, the step of heating and pressurizing water and the step of supplying said heated water to the water inlet of said eductor for entraining concentrated liquid food product out of the holder and for mixing said concentrated liquid food product with the heated water.

31. A system for preparing a foamed food product according to claim 19, wherein the product preparation apparatus is free of any cooling devices for the disposable assembly.

32. A system for preparing a foamed food product according to claim 19, wherein the product preparation apparatus is configured to prepare a foamed food product having a temperature in a range between 60° C. and 70° C., preferably in a range between 65° C. to 68° C.

33. A method for preparing a foamed food product according to claim 30, utilizing a system according to claim 29, wherein the method comprises the step of enabling connection of the water inlet of said eductor with the water connection of the disposable assembly between the step of heating and pressurizing water and the step of supplying said heated water.

34. A method according to claim 30, wherein the method comprises the step of heating water to such a temperature and supplying said heated water at such a pressure to the water inlet of said eductor that concentrated liquid food product is entrained out of the holder at such an amount that after mixing with the heated water a liquid food product with a substantially normal amount of dry matter is obtained.

35. A method according to claim 34, wherein the step of heating water heats water to a temperature in a range between 60° C. to 110° C., preferably 90° C. to 98° C., more preferred 95° C. to 98° C., wherein heated water having a pressure in a range between 0.11 and 2.5 MPa, preferably between 0.2 and 0.4 3 MPa is supplied to the water inlet of the eductor and wherein as concentrated liquid food product concentrated milk is used having 20 to 30 wt % dry matter, preferably 23-27 wt % dry matter.

36. A method according to claim 30, wherein the method comprises the step of keeping said disposable assembly at ambient temperature.

37. A method according to claim 30, wherein the method comprises the step of supplying gas to the microfiltration device under an overpressure of 0.101 to 0.15 MPa, and with a gas flow of 0.05 to 1.2 Nliters/min, preferably 0.05 to 0.4 Nliters/min, more preferred 0.15 to 0.4 Nliters/min, most preferred 0.2 to 0.3 Nliters/min.

38. A method according to claim 30, wherein the method comprises the step of deactivating heating of water and deactivating pressurization of water, wherein the method furthermore comprises the step of disabling the connection of the water inlet of said eductor with the water connection of the disposable assembly before the step of deactivating heating and deactivating pressurization of water.

* * * * *